Patented May 5, 1936

2,039,809

UNITED STATES PATENT OFFICE 2,039,809

PYRIDINO VAT DYESTUFFS, AND PROCESS OF PREPARING THEM

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application August 11, 1932, Serial No. 628,442. In Germany September 5, 1931

5 Claims. (Cl. 260—40)

The present invention relates to new vat dyestuffs and a process of producing same.

We have found that valuable condensation products are obtained by treating amino-pyridino compounds with acylating agents, or halogen-pyridino compounds with acid amides, whereby in all cases at least one reaction component must be capable of being vatted.

As suitable pyridino compounds may be mentioned, for example, pyridinoanthraquinones, pyridinobenzanthrones, pyridinoanthanthrones and pyridinopyranthrones which substituted by one or more amino groups or halogen atoms.

As acylating agents the carboxylic acid halides of the isocyclic, heterocyclic and hydroaromatic series may be employed, for example, the carboxylic acid chlorides of benzene, naphthalene, anthraquinone, benzanthrone, pyridine, quinoline. The acid amides corresponding to the beforementioned acid chlorides and also the sulphonic acid amides may be employed for the condensation with halogen pyridino compounds of the aforesaid kind, for example benzamide and toluene sulphamide.

The reaction may be carried out in the presence or absence of organic, preferably inert aromatic, solvents or diluents and/or of agents combining with acids and/or of condensing catalysts, as for example iron chloride or dimethylaniline. The reaction products are usually obtained in good yields and in a good state of purity.

Especially valuable compounds according to the present invention are the products which only contain reaction components which themselves are either not colored or whose color lies in the yellow to red shades of the color scale, as for example derivatives of anthraquinone, anthanthrone, dibenzpyrenequinone, ms-anthradianthrone, ms-benzdianthrone, and also the acylamines of monopyridino compounds.

The compounds produced according to the present invention are suitable as vat dyestuffs for the vegetable fibre. They differ from the acylamines dyeing from the vat which contain no pyridine ring in the molecule, not only in shade of color but by the more favorable behaviour of the dyeings to light and weather, especially in the range of the lighter colors.

The vat dyestuffs obtainable according to this invention may be purified by the usual methods, as for example by crystallization, vatting, boiling with organic solvents or, in the form of pastes, by treatment with hypochlorite solution or other oxidizing agents, as for example with an acidified chlorate solution.

The following examples will further illustrate the nature of this invention but the invention is not restricted to these examples. The parts are by weight.

Example 1

55 parts of amino-2(N)-3-pyridinoanthraquinone (obtainable by the nitration of 2(N)-3-pyridinoanthraquinone dissolved in sulphuric acid and reduction of the nitro derivative thus obtained) are heated to boiling in 200 parts of ortho-dichlorbenzene. A mixture of 30 parts of benzoyl chloride and 100 parts of dichlorbenzene is then introduced and the whole heated under a reflux condenser until the conversion is completed, which may be readily seen from the color of the reaction mixture. The whole is then allowed to cool and the precipitate is filtered by suction. It is a yellow powder which dissolves in concentrated sulphuric acid giving a yellow red coloration. The color of its vat is dirty gray-green. Cotton is dyed pure yellow shades from the vat.

The benzoyl derivatives of all amino substitution products of the isomeric pyridinoanthraquinones may be obtained in an analogous manner. The color of their solutions in sulphuric acid is usually from yellow to yellow red and they usually dye cotton yellow-green, yellow or orange shades.

Example 2

25 parts of 3-amino-2(N)-1-pyridinoanthraquinone and 27 parts of anthraquinone-2-carboxylic acid chloride are heated to boiling for several hours, while stirring, in 500 parts of ortho-dichlorbenzene. As soon as the conversion is completed the whole is allowed to cool and is filtered off by suction. The reaction product, anthraquinone - beta - carbonyl - 3 - amido - 2(N)-1-pyridinoanthraquinone, crystallizes from solvents of high boiling point in the form of green-yellow crystals and may be purified, if desired, by treatment with hypochlorite solution. It dyes vegetable fibres powerful yellow shades from a red vat.

Instead of anthraquinone-2-carboxylic acid chloride, substituted anthraquinone-2-carboxylic acid chlorides, as for example 1-amino-anthraquinone-2-carboxylic acid chloride or anthraquinone-alpha-carboxylic acid chloride may be employed and instead of 3-amino-2(N)-1-pyridino-anthraquinone, 1-amino-2(N)-3-pyridino-anthraquinone may be employed.

Example 3

28 parts of 3-amino-2(N)-1-pyridinoanthraquinone are heated to boiling with 500 parts of ortho-dichlorbenzene. 12 parts of a mixture of the chlorides of iso- and terephthalic acids which are diluted with 100 parts of dichlorbenzene are allowed to drop slowly into the boiling mixture. The whole is heated until the color of the mixture undergoes no further change, allowed to cool, the precipitated product filtered off, reprecipitated from sulphuric acid and the resulting dyestuff paste treated with hypochlorite solution whereby a lightening in color takes place. The reaction product dyes cotton powerful reddish shades of good fastness properties from a yellow red vat.

Example 4

10 parts of monoamino-monopyridinoanthanthrone (obtainable by reducing mononitro-pyridinoanthanthrone which is obtained from pyridinoanthanthrone by nitration) are heated to boiling for a short time in 200 parts of nitrobenzene with 7.5 parts of benzoyl chloride. After cooling the precipitate is filtered off. The resulting reaction product is an orange brown crystalline powder which dissolves in concentrated sulphuric acid giving a green coloration and yields a violet vat from which vegetable fibres are dyed powerful red brown shades of very good fastness.

The condensation product prepared in an analogous manner from aminopyridinoanthanthrone and 2,4,6-trichlor-1,3,5-triazine dyes cotton brown shades.

Example 5

60 parts of 3-brom-2(N)-1-pyridinoanthraquinone in 1000 parts of trichlorbenzene are heated to boiling with 120 parts of para-toluene sulphamide and 4 parts of copper oxide. 46 parts of potash are then added in batches while stirring well, the whole is boiled for some hours after the completion of the addition and filtered by suction. By cooling the filtrate the potassium salt of the resulting para-toluene sulphamido-compound is precipitated in the form of homogeneous red needles which, after isolation, yield by trituration with dilute acids the corresponding 3-para-toluene-sulphamido-2(N)-1-pyridinoanthraquinone.

By employing benzamide or meta-methoxybenzamide instead of para-toluene sulphamide, the corresponding 3-benzoylamido- or 3-meta-methoxybenzoylamido-2(N)-1-pyridinoanthraquinone is obtained.

What we claim is:

1. The condensation product corresponding to the formula

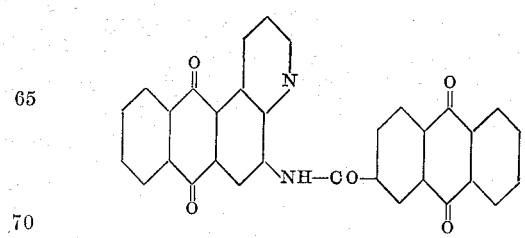

forming green yellow crystals and dyeing vegetable fibres powerful yellow shades from a red vat.

2. Mixtures of two components, both components corresponding to the formula

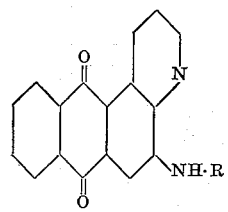

in one of the said components R being the acid radicle of iso-phthalic acid, in the other component R being the acid radicle of tere-phthalic acid, the said mixture dyeing cotton powerful reddish yellow shades of good fastness properties from a red vat.

3. Compounds corresponding to the general formula

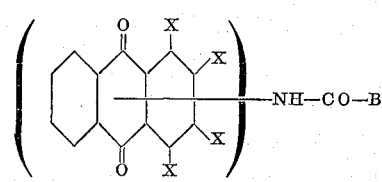

wherein to two vicinal of the positions marked X a condensed pyridino ring is attached which latter is combined with no further condensed ring, wherein the other X's represent hydrogen and wherein B represents an isocyclic ring one CH group of which may be replaced by N.

4. Compounds corresponding to the general formula

A—NH.CO—B wherein B is an isocyclic ring one CH group of which may be replaced by N, wherein A is the radicle of a compound the carbon skeleton of which corresponds to the formula

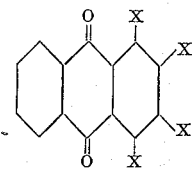

(wherein to two vicinal of the positions marked X a condensed pyridino ring is attached which latter is combined with no further condensed ring and wherein the other X's represent hydrogen), at least one of the radicles A and B being vattable.

5. A process of producing condensation products which comprises treating an amino derivative of a compound the carbon skeleton of which corresponds to the formula

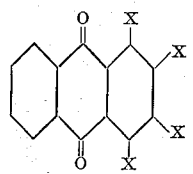

(wherein to two vicinal of the positions marked X a condensed pyridino ring is attached which latter is combined with no further condensed ring and wherein the other X's represent hydrogen), with a compound corresponding to the formula B.CO.Hal wherein B is an aromatic radicle, one CH group of which may be replaced by N.

MAX ALBERT KUNZ.
KARL KOEBERLE.
GERD KOCHENDOERFER.